April 13, 1965
J. A. CARLSON ETAL
3,177,571
ADJUSTABLE HUB CAP TOOL
Filed Sept. 27, 1962
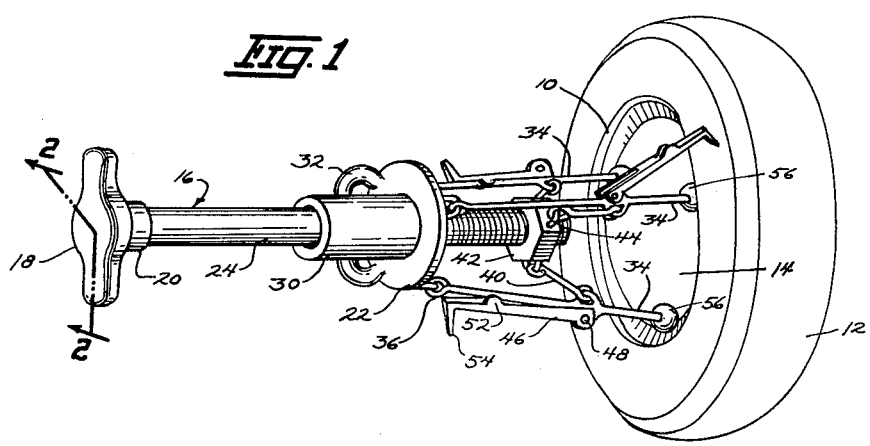
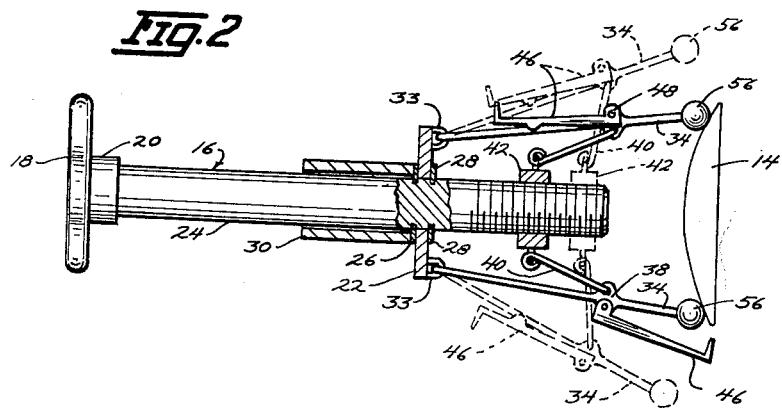
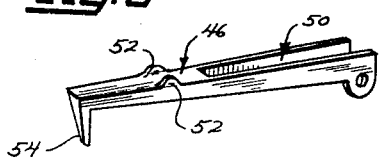
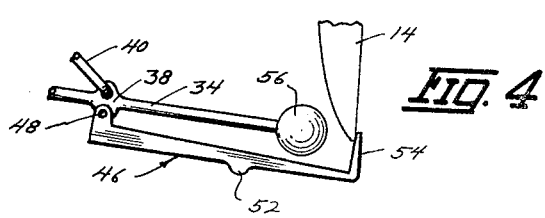
INVENTORS.
JUDITH A. CARLSON
ALVA H. CARLSON
BY *Dick, Zarley & Henderson*
ATTORNEYS.

United States Patent Office 3,177,571
Patented Apr. 13, 1965

3,177,571
ADJUSTABLE HUB CAP TOOL
Judith A. Carlson and Alva H. Carlson, both of R.R. 2,
Ankeny, Iowa
Filed Sept. 27, 1962, Ser. No. 226,585
3 Claims. (Cl. 29—245)

Automobile hub caps are sometimes difficult to both remove from and install on a vehicle wheel. Usually, more than one tool is required for these operations. Because of the fragile nature of hub caps, they are often damaged by the variety of tools used thereon.

Therefore, a principal object of our invention is to provide a hub cap tool that can easily be operated to either remove or install hub caps.

A further object of our invention is to provide a hub cap tool that can be operated without the use of auxiliary instruments.

A still further object of our invention is to provide a hub cap tool that can be used on hub caps of different sizes.

A still further object of our invention is to provide a hub cap tool that will not damage the hub caps while the hub cap is being acted on by the tool.

A still further object of our invention is to provide a hub cap tool that will be safe for the operator to use.

A still further object of our invention is to provide a hub cap tool which is economical to manufacture, durable in use and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawing, in which:

FIG. 1 is a perspective view of our device being used to place a hub cap on a vehicle wheel. The scale of the wheel with respect to the tool has been reduced to conserve space;

FIG. 2 is a side elevation of our device;

FIG. 3 is a perspective view of one of the fingers used on our device to remove hub caps; and FIG. 4 is a partial elevational view of our device being used to remove a hub cap.

We have used the numeral 10 to generally designate a vehicle wheel having a tire 12 and a circular hub cap 14 that is secured to the wheel 10 in conventional fashion.

An elongated shaft 16 has a handle 18 secured to its outer end by spot welding or the like. Handle 18 has a hub 20 which fits over the outer end of the shaft 16. A plate 22 is secured to shaft 16 near its midpoint to leave an exposed portion 24 of the shaft between the plate and its outer end. Shaft 16 rotatably extends through a suitable aperture in plate 22. Plate 22 is secured against longitudinal movement with shaft 16 by snap rings 26 and 28 which are received in grooves in shaft 16 immediately adjacent opposite sides of the plate. A sleeve 30 slidably embraces the exposed portion 24 of shaft 16. A handle 32 extends from one side of plate 22.

These equally-spaced eyelets 33 extend forwardly from plate 22. Rods 34 have eyelets 36 formed in one end thereof with the eyelets 36 being in pivotal engagement with one each of the eyelets 33. Ear elements 38 are located forwardly on each of the rods 34. A link 40 is pivotally secured by one of its ends to each of the ear elements 38 by forming a loop through a suitable aperture in each of the ear elements. Links 40 extend inwardly and rearwardly toward nut element 42 which is threadably mounted on the threaded forward end of shaft 16. Eyelets 44 are rigidly secured to nut element 42 and the eyelets pivotally receive loops formed in the rearward end of links 40.

Fingers 46 are pivotally secured to ear elements 38 by pins 48. Fingers 46 have a slot opening 50 extending from one end thereof through a substantial portion of their lengths. Oppositely disposed clip elements 52 are secured to one side of each finger, and gripping element 54 extends transversely from the ends of the fingers opposite to the end wherein they are pivoted to rods 34. Fingers 46 are adapted to extend beyond the ends of rods 34 when in their extended position, as shown in FIG. 4. Resilient spherical hub caps engaging elements 56 are secured in any convenient fashion to the forward extreme ends of rods 34.

The normal operation of our device is as follows: The operator can adjust the spaced distance between the forward ends of rods 34 by changing the relative position between nut element 42 and shaft 16. Thus, by grasping handle 32 on plate 22 with one hand, and by rotating shaft 16 by handle 18 with the other hand, the nut element 42 can be moved from the position shown by the solid lines in FIG. 2 to the position shown by the dotted lines. It can be seen that rods 34 and links 40 connect nut element 42 with plate 22 so as to prevent longitudinal movement of nut element 42 on shaft 16 unless shaft 16 is rotated with respect to rods 34, links 40 and nut element 42. This movement enables nut element 42 to pivot the rods 34 outwardly to the positions shown by the dotted lines in FIG. 2, and this is done through the links 40.

When the rods 34 have been moved to a position where elements 56 on the forward ends thereof can engage the proper portions of the hub cap 14, the hub cap is placed in mounting position on wheel 10 and our unit is placed thereagainst as shown in FIG. 1. The sleeve 30 is moved to a rearward position on shaft 16 adjacent handle 18. Fingers 46 are preferably pivoted to a rearward position shown by the dotted lines in FIG. 2 where clip elements 52 yieldingly hold the fingers against rods 34. The sleeve 30 is then moved forwardly against snap ring 26 and plate 22 to impart a force impact on rods 34, which in turn, urge the hub cap into securing engagement with wheel 10. This operation can be repeated as often as is necessary.

When it is desired to remove a hub cap, the rods 34 can be moved to a position where fingers 46 are pivotal partially behind the inner periphery of the hub cap, as shown in FIG. 4. Sleeve 30 is then moved to the position shown in FIG. 1, and is then suddenly moved rearwardly to create an impact force against the hub 20 of collar 18. This rearward force allows the fingers 46 to pull the hub cap away from the wheel 10, and thus the removal of the hub cap from the wheel is effected.

Thus, from the foregoing, it is seen that our invention will accomplish at least all of its stated objectives.

Some changes may be made in the construction and arrangement of our hub cap tool without departing from the real spirit and purpose of our invention, and it is our intention to cover by our claims, any modified forms of structure or use of mechanical equivalents which may be reasonably included within their scope.

We claim:
1. In a tool for removing and replacing hub caps,
an elongated shaft,
a plurality of rods movably operatively secured to said shaft,
finger elements pivotally secured to said rods,
a nut element movably mounted on said shaft,
link elements pivotally connecting said nut element and said rods,
said rods and said links operatively connecting said shaft and said nut element to prevent the relative movement therebetween unless said shaft is rotated with respect to said rods, said links and said nut element,
a sleeve slidably mounted on said shaft,
and means on said shaft to limit the slidable movement of said sleeve.

2. In a tool for removing and replacing hub caps,
an elongated shaft,
a sleeve slidably mounted on said shaft,
means on said shaft to limit the slidable movement of said sleeve,
a plate slidably, rotatably mounted on said shaft adjacent said sleeve,
means on said shaft to limit the slidable movement of said plate,
a nut element movably mounted on said shaft,
a plurality of rods pivotally connected to said plate,
and means pivotally connecting said nut element and said rods.

3. In a tool for removing and replacing hub caps,
an elongated shaft,
a plurality of rods movably operatively secured to said shaft,
said rods having resilient hub cap engaging elements on one end thereof,
finger elements pivotally secured to said rods,
a nut element movably mounted on said shaft,
link elements pivotally connecting said nut element and said rods,
said rods and said links operatively connecting said shaft and said nut element to prevent the relative movement therebetween unless said shaft is rotated with respect to said rods, said links and said nut element,
a sleeve slidably mounted on said shaft,
and means on said shaft to limit the slidable movement of said sleeve.

References Cited by the Examiner

UNITED STATES PATENTS

| | | | |
|---|---|---|---|
| 1,704,600 | 3/29 | Green | 29—267 |
| 2,162,819 | 6/39 | McKechnie et al. | 29—278 X |
| 2,303,851 | 12/42 | Lindroth | 29—244 |
| 2,620,556 | 12/52 | Gaubert | 29—245 |
| 3,029,502 | 4/62 | Middaugh | 29—267 X |

FOREIGN PATENTS 301,075  8/54  Switzerland.

WILLIAM FELDMAN, *Primary Examiner*.